(12) United States Patent
Wang et al.

(10) Patent No.: US 12,643,223 B2
(45) Date of Patent: Jun. 2, 2026

(54) ROBOT PROGRAM GENERATION METHOD FROM HUMAN DEMONSTRATION

(71) Applicant: FANUC CORPORATION, Yamanashi (JP)

(72) Inventors: Kaimeng Wang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 889 days.

(21) Appl. No.: 17/502,207

(22) Filed: Oct. 15, 2021

(65) Prior Publication Data

US 2023/0120598 A1 Apr. 20, 2023

(51) Int. Cl.
B25J 9/00 (2006.01)
B25J 9/16 (2006.01)
(Continued)

(52) U.S. Cl.
CPC ........... B25J 9/0081 (2013.01); B25J 9/1612 (2013.01); B25J 13/003 (2013.01); B25J 13/085 (2013.01);
(Continued)

(58) Field of Classification Search
CPC ...... B25J 9/0081; B25J 9/1612; B25J 13/003; B25J 13/085; B25J 19/023; B25J 13/00;
(Continued)

(56) References Cited

U.S. PATENT DOCUMENTS 5,694,535 A * 12/1997 Broekhuijsen ........ G06T 11/203
345/442
6,126,373 A 10/2000 Yee et al.
(Continued)

FOREIGN PATENT DOCUMENTS

CN 105058396 A 11/2015
CN 207888651 U 9/2018
(Continued)

OTHER PUBLICATIONS

Alexander Skoglund, Boyko Iliev, Bourhane Kadmiry, Rainier Palm, Programming by Demonstration pf Pick-and-Place Tasks for Industrial Manipulators using Task Primitives, IEEE International Symposium, 2007, pp. 368-373.
(Continued)

*Primary Examiner* — Fadey S. Jabr

(74) *Attorney, Agent, or Firm* — Shumaker, Loop & Kendrick LLP; John A. Miller

(57) ABSTRACT

A method for teaching a robot to perform an operation based on human demonstration using force and vision sensors. The method includes a vision sensor to detect position and pose of both the human's hand and optionally a workpiece during teaching of an operation such as pick, move and place. The force sensor, located either beneath the workpiece or on a tool, is used to detect force information. Data from the vision and force sensors, along with other optional inputs, are used to teach both motions and state change logic for the operation being taught. Several techniques are disclosed for determining state change logic, such as the transition from approaching to grasping. Techniques for improving motion programming to remove extraneous motions by the hand are also disclosed. Robot programming commands are then generated from the hand position and orientation data, along with the state transitions.

23 Claims, 9 Drawing Sheets

(51) Int. Cl.

| | | |
|---|---|---|
| *B25J 13/00* | (2006.01) | |
| *B25J 13/08* | (2006.01) | |
| *B25J 19/02* | (2006.01) | |
| *G06F 18/22* | (2023.01) | |
| *G06V 40/10* | (2022.01) | |
| *G06V 40/20* | (2022.01) | |

(52) U.S. Cl.
CPC ............ *B25J 19/023* (2013.01); *G06F 18/22* (2023.01); *G06V 40/107* (2022.01); *G06V 40/28* (2022.01)

(58) Field of Classification Search
CPC ...... B25J 9/1656; G06F 18/22; G06V 40/107; G06V 40/28; G05B 19/423
See application file for complete search history.

(56) References Cited

U.S. PATENT DOCUMENTS

| | | | |
|---|---|---|---|
| 8,521,331 | B2 | 8/2013 | Itkowitz |
| 9,492,923 | B2 | 11/2016 | Wellman et al. |
| 9,545,719 | B2 | 1/2017 | Huang et al. |
| 9,586,323 | B2 | 3/2017 | Diolaiti et al. |
| 9,815,191 | B2 | 11/2017 | Oleynik |
| 2013/0197696 | A1* | 8/2013 | Nammoto .............. B25J 9/1633 700/258 |
| 2014/0316570 | A1* | 10/2014 | Sun ...................... G05D 1/0246 700/250 |
| 2017/0249561 | A1 | 8/2017 | Abdallah |
| 2018/0250829 | A1* | 9/2018 | Hashimoto ............ B25J 9/1633 |
| 2019/0290999 | A1* | 9/2019 | Bradner ................ A63F 13/573 |
| 2019/0321983 | A1 | 10/2019 | Chen et al. |
| 2020/0130178 | A1 | 4/2020 | Colasanto et al. |
| 2022/0197277 | A1* | 6/2022 | Cabibihan ............... G06F 3/017 |
| 2022/0203517 | A1* | 6/2022 | Iwahara ................. G06V 10/82 |

FOREIGN PATENT DOCUMENTS

| | | |
|---|---|---|
| JP | 2776477 B2 | 7/1998 |
| WO | 2011065034 A1 | 6/2011 |
| WO | 2019064752 A1 | 4/2019 |

OTHER PUBLICATIONS

Manuel Muhlig, Michael Gienger, Sven Hellbach, Jochen J. Steil, Christian Goerick, Task-Level Imitation Learning Using Variance-Based Movement Optimization, IEEE International Conference on Robotics and Automation, 2009, pp. 1177-1184.

* cited by examiner

Trigger state transition by button

Press button on teach pendant or
an isolated button

Trigger state transition by hand gesture.

Gesture identification

"READY" sign     "OK" sign

Trigger state transition by force detection

Trigger state transition by Speech Recognition

ROBOT PROGRAM GENERATION METHOD FROM HUMAN DEMONSTRATION

BACKGROUND

Field

The present disclosure relates to the field of industrial robot programming and, more particularly, to a method for programming a robot by human demonstration to perform a workpiece pick, move and place operation, including vision and force sensors to track both the human hand and the workpiece, where the method uses the sensor inputs for teaching both motions and state change logic, and generates robot programming commands from the motions and the state changes.

Discussion of the Related Art

The use of industrial robots to repeatedly perform a wide range of manufacturing, assembly and material movement operations is well known. However, teaching a robot to perform even a fairly simple operation—such as picking up a workpiece in a random position and orientation on a conveyor and moving the workpiece to a shipping container—has been unintuitive, time-consuming and/or costly using conventional methods.

Robots have traditionally been taught to perform pick and place operations of the type described above by a human operator using a teach pendant. The teach pendant is used by the operator to instruct the robot to make incremental moves—such as "jog in the X-direction" or "rotate gripper about local Z-axis"—until the robot and it's gripper are in the correct position and orientation to grasp the workpiece. Then the robot configuration and the workpiece position and pose are recorded by the robot controller to be used for the "pick" operation. Similar teach pendant commands are then used to define the "move" and "place" operations. However, the use of a teach pendant for programming a robot is often found to be unintuitive, error-prone and time-consuming, especially to non-expert operators.

Another known technique of teaching a robot to perform a pick and place operation is the use of a motion capture system. A motion capture system consists of multiple cameras arrayed around a work cell to record positions and orientations of a human operator and a workpiece as the operator manipulates the workpiece. The operator and/or the workpiece may have uniquely recognizable marker dots affixed in order to more precisely detect key locations on the operator and the workpiece in the camera images as the operation is performed. However, motion capture systems of this type are costly, and are difficult and time-consuming to set up and configure precisely so that the recorded positions are accurate.

Other existing systems which teach robot programming from human demonstration exhibit various limitations and disadvantages. One such system requires the use of a special glove fitted with sensors to determine hand and workpiece actions. Other systems visually track either the hand or the workpiece, but have difficulty determining accurate gripper commands due to visual occlusion of the hand by the workpiece, inability to decipher hand velocity transitions, or for other reasons.

In light of the circumstances described above, there is a need for an improved robot teaching technique which is simple and intuitive for a human operator to perform, and which reliably captures motions and actions such as gripping and ungripping.

SUMMARY

In accordance with the teachings of the present disclosure, a method for teaching a robot to perform an operation based on human demonstration using force and vision sensors is described and illustrated. The method includes a vision sensor to detect position and pose of the human's hand and optionally a workpiece during teaching of an operation such as pick, move and place. The force sensor, located either beneath the workpiece or on a tool, is used to detect force information. Data from the vision and force sensors, along with other optional inputs, are used to teach both motions and state change logic for the operation being taught. Several techniques are disclosed for determining state change logic, such as the transition from approaching to grasping. Techniques for improving motion programming to remove extraneous motions by the hand are also disclosed. Robot programming commands are then generated from the hand positions and orientations, along with the state transitions.

Additional features of the presently disclosed systems and methods will become apparent from the following description and appended claims, taken in conjunction with the accompanying drawings.

DETAILED DESCRIPTION OF THE EMBODIMENTS

Figure 1:
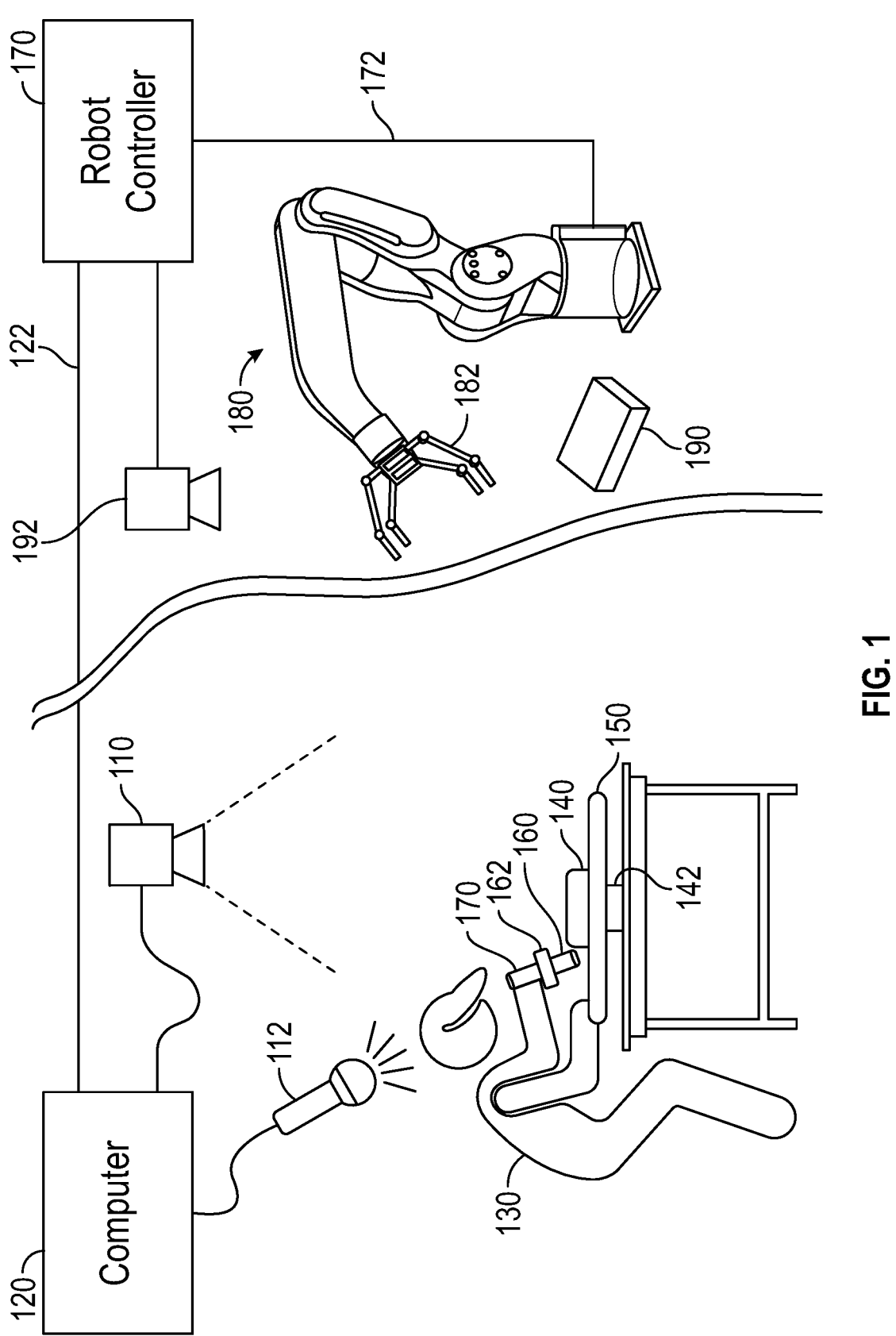
FIG. 1 is an illustration of a system for generating a robot program from human demonstration, according to an embodiment of the present disclosure.

The following discussion of the embodiments of the disclosure directed to robot program generation by human demonstration is merely exemplary in nature, and is in no way intended to limit the disclosed devices and techniques or their applications or uses.

It is well known to use industrial robots for a variety of manufacturing, assembly and material movement operations. One such type of robotic operation is known as "pick, move and place", where a robot picks up a part or workpiece from a first location, moves the part and places it at a second location. The first location may be a conveyor belt where randomly oriented parts are streaming, such as parts which were just taken from a mold. The second location may be a shipping container in which the part needs to be placed in a particular location and pose. Another example involves the robot picking up a component and installing it in a product assembly operation.

In order to perform pick, move and place operations of the type described above, a camera is typically used to determine the position and orientation of parts to be picked up, and a robot must be taught to grasp the part in a specific manner using a prescribed gripper such as a finger-type gripper, a parallel-jaw gripper or a magnetic or suction cup gripper. Teaching the robot how to grasp the part according to the part's orientation has traditionally been done by a human operator using a teach pendant. The teach pendant is used by the operator to instruct the robot to make incremental moves—such as "jog in the X-direction" or "rotate gripper about local Z-axis"—until the robot and its gripper are in the correct position and orientation to grasp the workpiece. Then the robot configuration and the workpiece position and pose are recorded by the robot controller to be used for the "pick" operation. Similar teach pendant commands are then used to define the "move" and "place" operations. However, the use of a teach pendant for programming a robot is often found to be unintuitive, error-prone and time-consuming, especially to non-expert operators.

Another known technique of teaching a robot to perform a pick, move and place operation is the use of a motion capture system. A motion capture system consists of multiple cameras arrayed around a work cell to record positions and orientations of a human operator and a workpiece as the operator manipulates the workpiece. The operator and/or the workpiece may have uniquely recognizable marker dots affixed in order to more precisely detect key locations on the operator and the workpiece in the camera images as the operation is performed. However, motion capture systems of this type are costly, and are difficult and time-consuming to set up and configure precisely so that the recorded positions are accurate.

The present disclosure overcomes the limitations of existing robot teaching methods by providing a technique which uses force and vision sensors to record information about a human demonstrator's hand and the workpiece, including both motions and state transition logic, and uses the recorded information to generate a robot program with the pick, move and place motions and corresponding gripping and ungripping commands. The technique is of course applicable to any type of robotic part handling operation—not just pick, move and place.

Along with several techniques for identifying state transitions, and other techniques for refining motions and grasp poses to mitigate extraneous human hand motion, the methods of the present disclosure include identifying and tracking key points of a human hand by analysis of camera images or vision sensor data. Methods and systems for identifying and tracking key points of a human hand by analysis of camera images were disclosed in U.S. patent application Ser. No. 16/843,185 (hereinafter "the '185 application"), titled ROBOT TEACHING BY HUMAN DEMONSTRATION, filed 8 Apr. 2020 and commonly assigned with the present application, and hereby incorporated by reference in its entirety.

The '185 application discloses techniques for analyzing images from a single two-dimensional (2D) or three-dimensional (3D) camera to identify and track 3D coordinates of key points of the human hand. The key points include anatomic features such as the tip, knuckle and base of the thumb, and the tips, knuckles and bases of the fingers. From the 3D coordinates of these key points, the '185 application discloses techniques for computing gripper position and orientation, for both finger-style grippers and suction-cup style grippers among others. For example, the thumb and index finger of the human hand can be transposed to positions of a parallel-jaw or finger-style gripper, or a bisector of the thumb and index finger can be used as an axis of a single-suction-cup gripper. These hand pose and corresponding gripper pose determination techniques based on camera image input, from the '185 application, are used extensively in the methods of the present disclosure.

FIG. 1 is an illustration of a system for generating a robot program from human demonstration, according to an embodiment of the present disclosure. A vision sensor 110 provides images and/or data depicting a workspace and provides the images and/or data to a computer 120. For the purposes of the remaining discussion, the vision sensor 110 will be described as a camera, which could be a 2D or 3D camera providing continuous images (such as video at up to 30 frames per second). A microphone 112 provides audio signals to the computer 120, where the microphone 112 picks up sounds from the workspace including spoken commands.

A human demonstrator 130 uses one or both hands to operate on one or more workpieces. In one example, a workpiece 140 rests on a platform 150. The human demonstrator 130 may pick up the workpiece 140, move it and place it in a new position and pose. A force sensor 142 is located beneath the workpiece 140, either directly beneath the workpiece 140, or under the platform 150. The force sensor 142 is positioned and configured to detect forces on the workpiece 140—particularly vertical forces. The usage of the data from the force sensor 142 is discussed later.

In another example, a second workpiece 160 is coupled to a tool 170 with a force sensor 162 coupled between the second workpiece 160 and the tool 170. The human demonstrator manipulates the tool 170 such that the second workpiece 160 is placed in a desired position and pose in the workpiece 140—such as an electronic component plugged into an assembly, or a peg inserted into a hole. The force sensor 162 is configured to detect forces and torques on the second workpiece 160 during the assembly operation. The usage of the data from the force sensor 162 is discussed later.

The force sensors 142 and/or 162 (usually only one or the other) provide their force and torque data to the computer 120, either wirelessly or via hard-wire connection. Along with the data from the force sensors 142 and/or 162, the computer 120 receives the audio signals from the microphone 112 and the images from the vision sensor 110, where the images are analyzed to determine the pose (3D positions of the key points) of at least one hand of the human demonstrator 130, and may also be analyzed to determine the pose of the other hand and/or the workpieces 140 and 160. In different embodiments of the disclosed techniques, the hand pose data, workpiece pose data, force data and audio data are used by the computer 120 to generate a robot program for an operation such as pick, move and place. All of this is discussed further below.

The robot motion program generated by the computer 120 is provided to a robot controller 170 which controls a robot 180. The controller 170 typically communicates with the robot 180 via a cable 172, including the controller 170 providing joint motion commands to the robot 180 and receiving joint encoder position data from the robot 180, in a manner known in the art. The robot 180 is fitted with a gripper 182, which may be any type of gripper—such as parallel-jaw, finger-style, magnetic, suction cup (single cup or multiple cups in an array), etc. The controller 170 also provides gripper action commands to the robot 180, such as grip and ungrip. The computer 120 may communicate with the controller 170 wirelessly or via a hard-wire or network connection 122.

The system of FIG. 1 is used to generate a robot program from human demonstration as follows. The human demonstrator 130 teaches a sequence of actions for the program, where the motions and state transition logic (grip, move, place, etc.) are captured, and the program is generated therefrom by the computer 120. This is discussed in detail below. The robot program is then transferred from the computer 120 to the controller 170, and the controller 170 subsequently uses the program to pick/move/place parts 190 which are detected by a camera or vision sensor 192 communicating with the controller 170.

Figure 2:
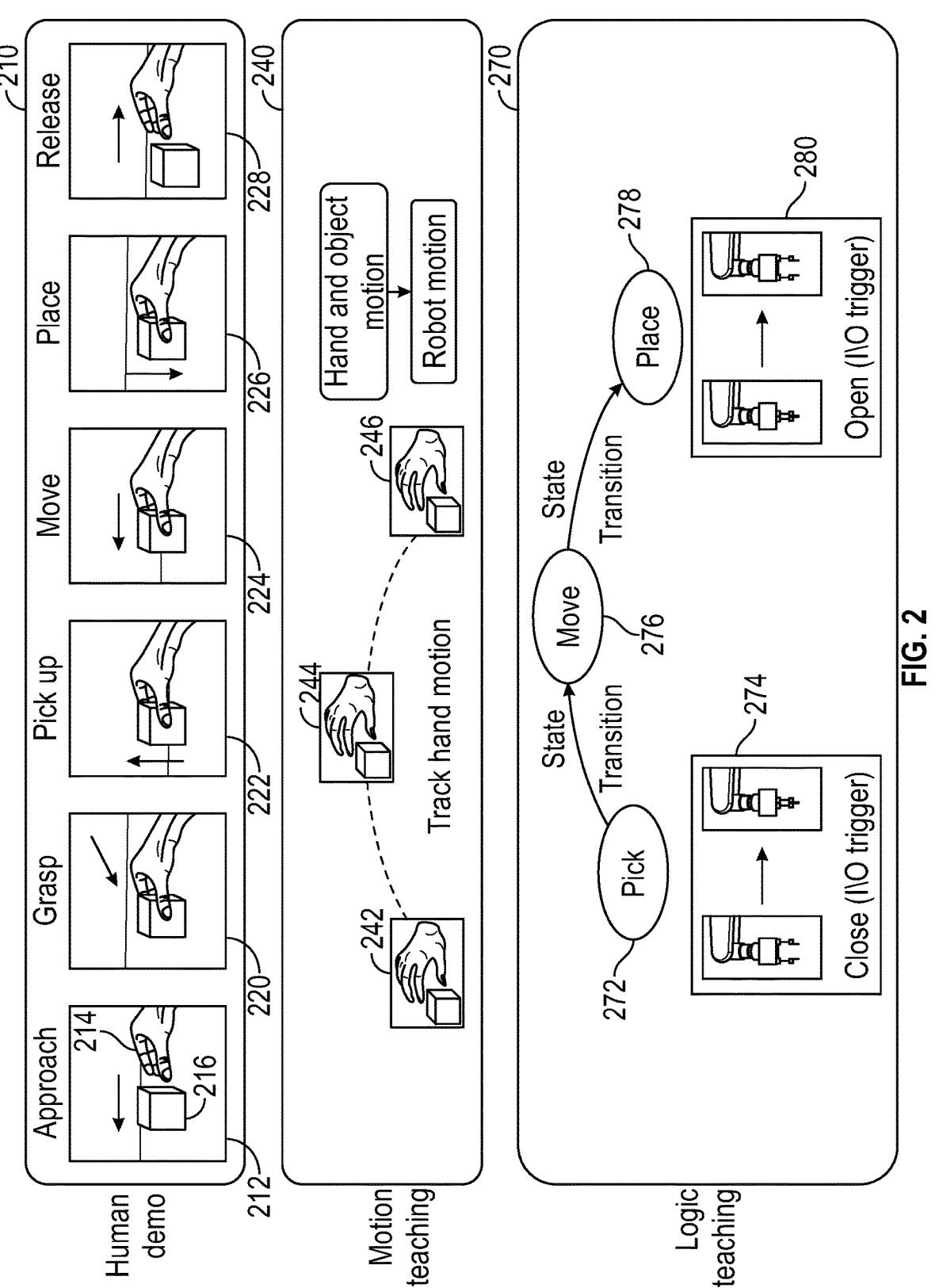
FIG. 2 is an illustration of movements of a human demonstrator's hand and corresponding elements of robot motion and state transition logic teaching, according to an embodiment of the present disclosure.

FIG. 2 is an illustration of movements of a human demonstrator's hand and corresponding elements of robot motion and state transition logic teaching, according to an embodiment of the present disclosure. In box 210, the steps performed by a human demonstrator during a pick, move and place operation are illustrated. In box 212, an approach step is depicted, where a hand 214 of the human demonstrator approaches an object 216. In box 220, a grasp or "pick" step is depicted, where the hand 214 of the human demonstrator grasps the object 216 between the fingers of the hand 214. In box 222, a pick up step is depicted, where the hand 214 picks up the object 216 off of the surface on which the object 216 was resting. In box 224, a move step is depicted, where the hand 214 moves the object 216 from where it was originally located to a destination location. In box 226, a place step is depicted, where the hand 214 places the object 216 on a surface at the destination location. In box 228, a release (or "depart") step is depicted, where the hand

214 moves away from the object 216 after placing it on the surface at the destination location.

The steps illustrated in the box 210 are of course performed by the human demonstrator in a fairly smooth, continuous sequence. It is therefore often difficult for a system capturing the human demonstration, for the purposes of robot program teaching, to detect and determine the exact moment at which a specific step begins or ends. The techniques of the present disclosure address this difficulty by using both force and vision sensors to detect the human demonstration, and including both motion teaching and state transition logic teaching in embodiments of the methodology.

In box 240, the motion teaching steps recorded by the program generation system (e.g., the system of FIG. 1) during a pick, move and place operation are illustrated. The motion teaching steps in the box 240 are fewer in number than the steps performed by the hand 214 of the human demonstrator in the box 210. This is because the approach and release/depart motions can be computed by the program generation system (by the computer 120 or even the controller 170) based on the pose of the hand 214 relative to the object 216 at the grasp and place steps, respectively. For example, based on the way the hand 214 is oriented relative to the object 216 at the grasp step, the computer 120 can compute an appropriate approach motion. Similarly for the depart motion relative to the place pose. In addition, the pick up step (at the box 222), although it may be a conscious step by the human demonstrator, can be combined into the move step (at the box 224).

Thus, the motion teaching steps in the box 240 can be defined simply as pick (or grasp), move and place. The pick step at box 242 records the position and orientation of the hand 214 (the key points of the hand 214) and the object 216 (although object position/pose may already be known) at the moment when the human demonstrator grasps the object 216. The move step at box 244 records the position and orientation of the hand 214 (again, the key points of the hand 214) as the object 216 is moved from its initial position/pose to its destination position/pose. The place step at box 246 records the position and orientation of the hand 214 and optionally the object 216 at the moment when the human demonstrator releases the object 216 at the destination position/pose.

The motion teaching steps in the box 240 are recorded by the program generation system by visually tracking hand motion and optionally object motion. Detection of the key points of the hand 214 from camera images, and conversion of the hand key point data to gripper pose, were described in detail in the '185 application discussed above.

In box 270, the logic teaching steps recorded by the program generation system (e.g., the system of FIG. 1) during a pick, move and place operation are illustrated. Logic teaching, which includes identifying state transitions, may be used in conjunction with the motion teaching steps of the box 240 to enable precise robot program generation from human demonstration.

Shown in a first oval at the left is a pick state 272. Techniques for detecting that the pick state 272 has been entered will be discussed below in relation to later figures. The pick state 272 has an associated action 274 of closing or activating the robot gripper. A move state 276 is the state in which the robot controller moves the gripper and the object from the initial position to the target position. Again, techniques for detecting a transition indicating that the move state 276 has been entered will be discussed below. Following the move state 276 is a place state 278. The place state 278 has an associated action 280 of opening or deactivating the robot gripper.

Figure 3:
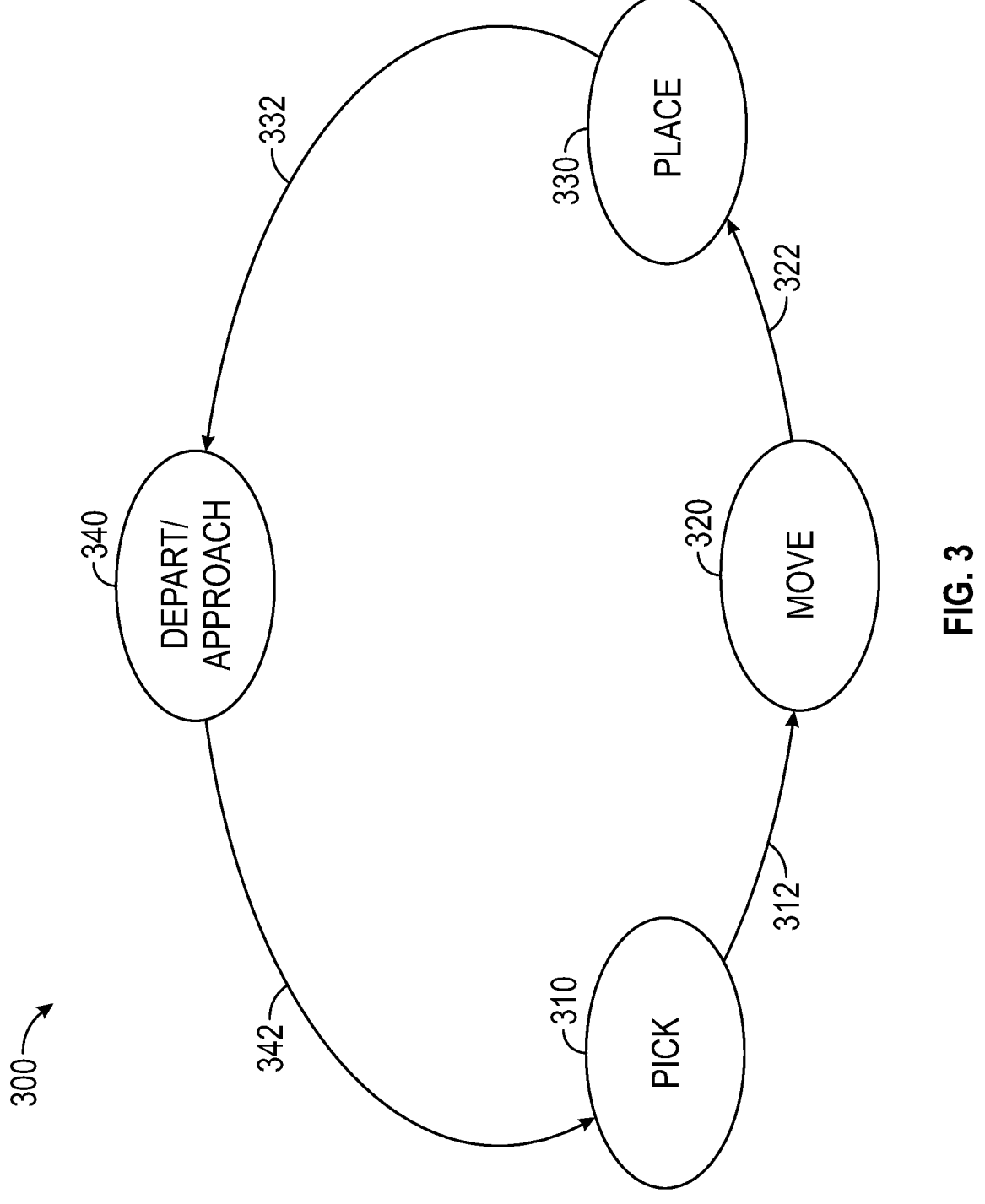
FIG. 3 is a state diagram 300 showing the states and transitions used in the logic teaching portion of the robot program generation method, according to an embodiment of the present disclosure.

FIG. 3 is a state diagram 300 showing the states and transitions used in the logic teaching portion of the robot program generation method, according to an embodiment of the present disclosure. As known in the art, a state diagram shows the behavior of a system in response to external stimuli or events. The state diagram 300 includes four discrete states, each having a single transition to another state in a continuous loop. States may have an "entry action", which is an action taken by the system when the state is entered. The state diagram 300 is used to illustrate the states, actions, trigger events, and transitions which can be applied to the robot program generation system and method described above with respect to FIGS. 1 and 2.

The present disclosure introduces the concept of detecting a specific event which triggers a transition from one state to the next in robot program generation from human demonstration. In order to apply this concept, the states and the corresponding transitions must first be defined, which is done in FIG. 3. Then various types of events can be used as triggers—as discussed below relative to FIGS. 4-8.

The state diagram 300 includes a pick state 310. The pick state 310 has an entry action of "close gripper" (or "activate gripper" which is more applicable to suction grippers). That is, when the pick state 310 is entered, the program generation system will generate a command to close or activate the robot gripper. The pick state 310 has a transition 312 to a move state 320. The move state 320 is the state in which the object (or workpiece) is moved from its initial pose (position and orientation) to its target pose. In the move state 320, the program generation system will generate commands causing the robot gripper to move the object through the prescribed motion (as captured by the vision sensor 110).

The move state 320 has a transition 322 to a place state 330, triggered by detection of an event as discussed below. The place state 330 is where the robot gripper releases the object in its target pose. The place state 330 thus has an entry action of "open gripper" (or "deactivate gripper"). That is, when the place state 330 is entered, the program generation system will generate a command to open or deactivate the robot gripper. The place state 330 has a transition 332 to a depart/approach state 340. The depart/approach state 340 is the state in which the robot gripper is free to move with no object, after placing the previous object at its target pose and before going to pick up the next object. The depart/approach state 340 has a transition 342 back to the pick state 310, which is entered when a trigger event (discussed below) is detected.

In the state diagram 300, the depart/approach state 340 could be separated into two states—a depart state and an approach state, with a transition from depart to approach being triggered by the arrival of camera images of the next object to pick up. Yet another state, such as "perch" or "wait", could even be added between the depart state and the approach state. However, the state diagram 300 is drawn with the combined depart/approach state 340 for the sake of simplicity, as this is sufficient for the following discussion of various types of state transition triggers.

Figure 4:
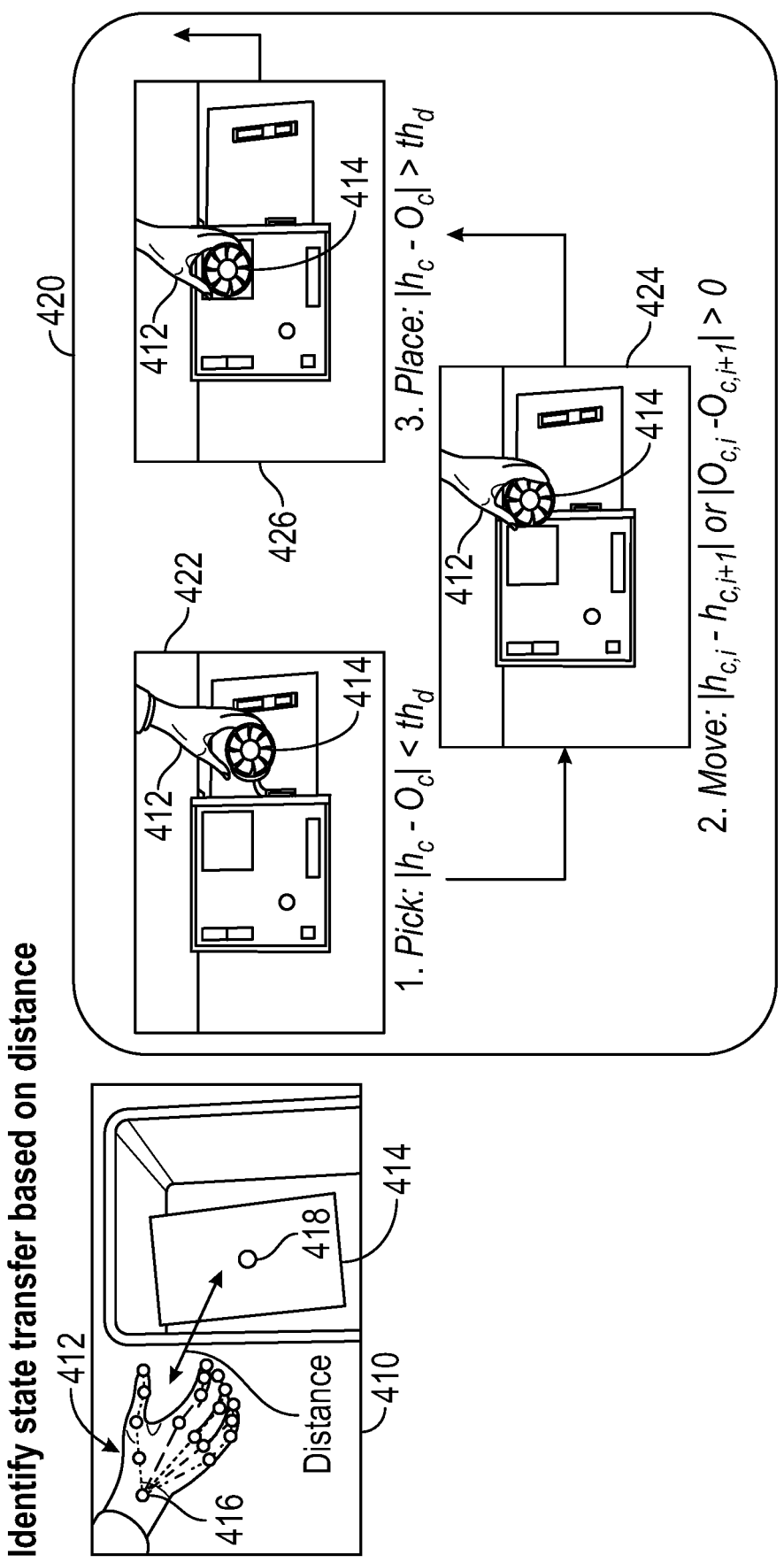
FIG. 4 is an illustration of a first technique for logic teaching in robot program generation, where a distance between the human demonstrator's hand and the object is used to trigger state transitions, according to an embodiment of the present disclosure.

FIG. 4 is an illustration of a first technique for logic teaching in robot program generation, where a distance between the human demonstrator's hand and the object is used to trigger state transitions, according to an embodiment of the present disclosure. Box 410 contains an illustration which depicts the overall idea of the first technique for logic teaching. A hand 412 and an object 414 are identified in camera images, as discussed above. The hand 412 identified in the camera images includes 3D coordinates of many key points on the fingers and thumb. From these key points, a hand center point 416 can be designated. For example, a hand center point 416 may be chosen as a wrist point (either identified directly from the images, or computed from the key points on the fingers and thumb), as the wrist point is never occluded by other parts of the hand 412 or the object 414.

Likewise, an object center point 418 may be designated in any suitable fashion—such as a center of the top-view area of the object 414, or a known object center point from CAD data transposed to fit the camera images. From the 3D locations of the hand center point 416 and the object center point 418, a distance between the two can be computed. This distance is used in the state transition logic.

A box 420 contains illustrations and descriptions of the state transition logic used in this first method. Box 422 includes an illustration of detection of a pick step according to the method. In this method, the transition to the pick state (from approach) is triggered by the distance from the hand center point 416 to the object center point 418 dropping below a prescribed threshold. The threshold is defined based on what point on the hand 412 is chosen as the hand center point 416, and the nature of the object 414 and the object center point 418. For example, the threshold could be set to a value of 75 millimeters (mm), as it may be physically impossible for the hand center point 416 to get much nearer the object center point 418 than 75 mm.

In the method of FIG. 4, the transition to the pick state is triggered when $|h_c-O_c|<th_d$, where $h_c$ and $O_c$ are the 3D coordinates of the hand center point 416 and the object center point 418, respectively, $|h_c-O_c|$ is the distance from the hand center point 416 to the object center point 418 (computed by square root of the sum of the squares of the differences in x, y and z coordinates), and $th_d$ is the threshold distance discussed above. Referring again to FIG. 1, the camera or vision sensor 110 provides images to the computer 120 and the computer 120 continuously analyzes hand and object geometry and distance. When the distance between the center points drops below the threshold distance, the computer 120 triggers a transition to the pick state, meaning that the hand pose and the object pose will be captured at this instant to define the pick point, and a corresponding "close gripper" command will be included in the robot program.

Box 424 includes an illustration of detection of a move step according to the method of FIG. 4. In this method, the transition to the move state is triggered by movement of the hand center point 416 or the object center point 418 or both. As discussed above with respect to FIG. 3, the state machine system is defined such that the only transition to the move state is from the pick state. Thus, once the pick state is entered as shown in the box 422, the computer 120 can begin calculating positions of the hand center point 416 and the object center point 418 in successive camera images. Following entry of the pick state, when the hand center point 416 or the object center point 418 is determined to have moved from one image to the next, this is used to trigger the move state.

Mathematically, the transition to the move state is triggered when $|h_{c,i}-h_{c,i+1}|>0$, or $|O_{c,i}-O_{c,i+1}|>0$, where $h_{c,i}$ and $h_{c,i+1}$ are the 3D coordinates of the hand center point 416 at a time step (camera image) i and a following step i+1, respectively, and likewise for the object center point 418. The differences in absolute value brackets are computed as described for the box 422 above. Referring again to FIG. 1, the camera or vision sensor 110 provides images to the computer 120 and the computer 120 continuously analyzes hand and object geometry. When one or both of the center points exhibits movement from one camera image to the next, the computer 120 triggers a transition to the move state, meaning that the hand pose and the object pose will be captured beginning at this instant to define the "move" motion, ending when the place state is triggered.

Box 426 includes an illustration of detection of a place step according to the method of FIG. 4. In this method, the transition to the place state (from move) is triggered by the distance from the hand center point 416 to the object center point 418 exceeding a prescribed threshold. The threshold may be the same as the threshold used for triggering the pick state, or the threshold may be computed as a new value based on the actual distance from the hand center point 416 to the object center point 418 measured during the move state.

In the method of FIG. 4, the transition to the place state is triggered when $|h_c-O_c|>th_d$, where the terms are all defined as before. From the previous state (move), the only possible transition is to the place state, which makes detection of the distance exceeding the threshold very straightforward. Referring again to FIG. 1, the camera or vision sensor 110 provides images to the computer 120 and the computer 120 continuously analyzes hand and object geometry and distance. When the distance between the center points exceeds the threshold distance, the computer 120 triggers a transition to the place state, meaning that the hand pose and the object pose will be captured at this instant to define the place point, and a corresponding "open gripper" command will be included in the robot program.

Following the triggering of the place state, motion of the hand 412 away from the object 414 can be used to trigger a transition to the depart/approach state, where the motion of the hand 412 is determined in the same manner as the move state discussed above. From the depart/approach state, transition to the pick state is detected as described above relative to the box 422.

Figures 5, 6:
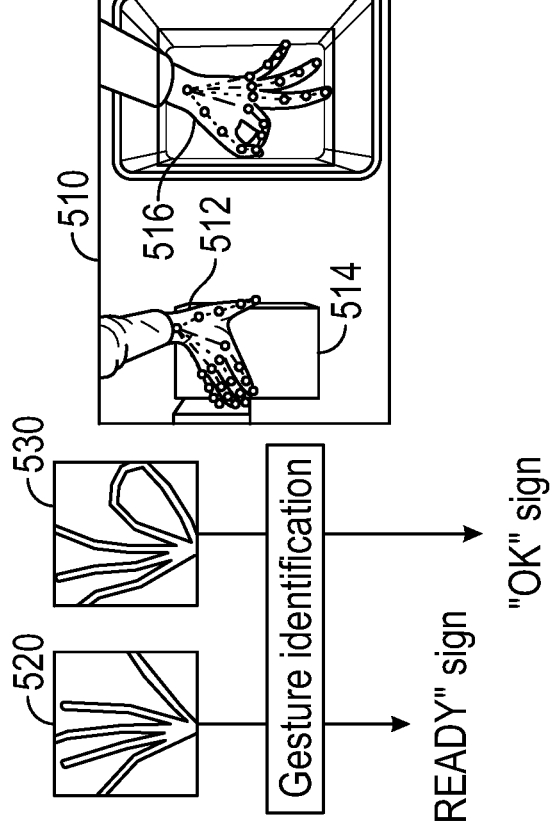
FIG. 5 is an illustration of a second technique for logic teaching in robot program generation, where a gesture by a second hand of the human demonstrator is used to trigger state transitions, according to an embodiment of the present disclosure.
FIG. 6 is an illustration of a third technique for logic teaching in robot program generation, where a button push by a second hand of the human demonstrator is used to trigger state transitions, according to an embodiment of the present disclosure.

FIG. 5 is an illustration of a second technique for logic teaching in robot program generation, where a gesture by a second hand of the human demonstrator is used to trigger state transitions, according to an embodiment of the present disclosure. Box 510 contains an illustration of a first hand 512, the right hand in this case, of the human demonstrator proximal an object 514. A second hand 516, the left hand in this case, is also included in the camera images.

The logic teaching method shown in FIG. 5 uses a hand gesture by the second hand 516 (the hand which is not grasping and moving the object 514) to trigger state transitions. In one embodiment, the "OK" sign by the second hand 516 is the trigger for state transitions (tips of the thumb and index finger touching, forming an "O" shape with those two digits). The computer 120 continuously analyzes images of the first hand 512, the object 514 and the second hand 516. As shown in the state diagram 300, the state machine always knows what state is currently occupied, and only one state transition is valid. Thus, when the computer 120 detects that the second hand 516 has formed the OK sign, this triggers a transition—from approach state to pick state, for example. The same technique is used for each of the state transitions.

Box 520 contains an illustration of the second hand 516, specifically the key points and bone segments as detected from the camera image in the manner disclosed in the '185 application. In the box 520, the second hand 516 is not in the "OK" configuration, but rather in a "Ready" configuration, meaning that the human demonstrator is not triggering a state transition. In a box 530, the second hand 516 is shown in the "OK" configuration, meaning that the human demonstrator is triggering a state transition. Because the state diagram 300 is defined to proceed in a continuous loop, with only one valid transition available from each state, the same "OK" sign can be used by the second hand 516 of the human demonstrator to trigger each of the transitions—from approach to pick, from move to place, etc. Other hand gestures besides the "OK" sign could also be used to trigger a state transition.

FIG. 6 is an illustration of a third technique for logic teaching in robot program generation, where a button push by a second hand of the human demonstrator is used to trigger state transitions, according to an embodiment of the present disclosure. Box 610 contains an illustration of a first hand 612, the right hand in this case, of the human demonstrator proximal an object 614. A second hand 616, the left hand in this case, is also included in the camera images.

The logic teaching method shown in FIG. 6 uses a button push by the second hand 616 (the hand which is not grasping and moving the object 614) to trigger state transitions. In one embodiment, a teach pendant 620 is provided to the human demonstrator and pressing a button on the teach pendant 620 is the trigger for state transitions. The entire program generation method could be run on the robot controller 170 in communication with the vision and force sensors and the teach pendant 620 to signal state transitions. A simple stand-alone push button could also be used as the state transition trigger. The computer 120 (or the controller 170) continuously analyzes images of the first hand 612 and optionally the object 614 for motion teaching purposes. As shown in the state diagram 300, the state machine always knows what state is currently occupied, and only one state transition is valid. Thus, when the computer 120 detects the button push from the teach pendant 620 or other signaling device, this triggers a transition—from approach state to pick state, or from move state to place state, for example. The same technique is used for each of the state transitions.

Figures 7, 8:
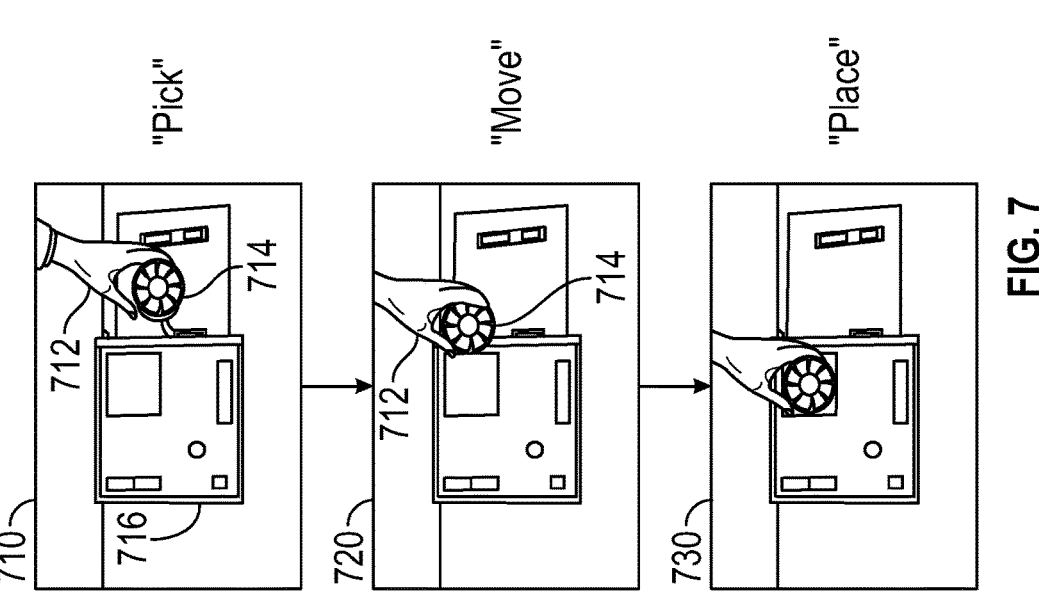
FIG. 7 is an illustration of a fourth technique for logic teaching in robot program generation, where a spoken command by the human demonstrator is used to trigger state transitions, according to an embodiment of the present disclosure.
FIG. 8 is an illustration of a fifth technique for logic teaching in robot program generation, where force sensor input is analyzed and used to trigger state transitions, according to an embodiment of the present disclosure.

FIG. 7 is an illustration of a fourth technique for logic teaching in robot program generation, where a spoken command by the human demonstrator is used to trigger state transitions, according to an embodiment of the present disclosure. Box 710 contains an illustration of a hand 712 of the human demonstrator as it is just grasping an object 714. The scenario illustrated in FIG. 7 is that the object 714 is to be picked up and placed in an installed position in an assembly 716. In the method of FIG. 7, the human demonstrator speaks a verbal command to trigger a state transition. For example, at the box 710, the human demonstrator says "pick" to signal the moment at which the pick state should be entered. The spoken command is detected by a microphone which is connected to or communicates with the computer 120.

As in the other state transition detection methods described earlier, the verbal command to transition to the pick state causes the system to detect and capture the position and pose of at least the hand 712 (3D coordinates of all detectable key points) at the moment of state transition. This enables the system to compute a gripper position and pose associated with the pick state, with an accompanying command to close or activate the gripper. The system may also optionally detect and capture the pose of the object 714.

At box 720, the hand 712 is moving the object 714 from the pick location to the place location. Just prior to moving the object 714, the human demonstrator would say "move", causing the system to transition to the move state and capture the motion of at least the hand 712 (and optionally also the object 714). At box 730, the hand 712 is just releasing the object 714 at the place location. Just prior to releasing the object 714, the human demonstrator would say "place", causing the system to transition to the place state and capture the final pose of the hand 712 (and optionally also the object 714) at the destination location. As discussed earlier, the position and pose/configuration of the hand 712 (3D coordinates of the key points) is readily converted to gripper position and pose by the system, to be included in the robot motion program.

Additional verbal commands could also be recognized by the system, such as "release" or "depart", and "approach". However, as discussed previously, these state transitions can be inferred by the system following the place state, according to the state diagram 300.

FIG. 8 is an illustration of a fifth technique for logic teaching in robot program generation, where force sensor input is analyzed and used to trigger state transitions, according to an embodiment of the present disclosure. A human demonstrator 810 is operating on a workpiece 820 in a workspace including a digital camera or vision sensor 830. The workpiece 820 is placed on a platform 840, which has a force sensor 850 situated underneath. The workpiece 820 could be an assembly (similar to the assembly 716 of FIG. 7) in which the human demonstrator 810 is placing a small component part (not shown). The force sensor 850 provides signals to the computer 120, where analysis of the force sensor signals enables detection of state transitions.

Graph 860 conceptually illustrates how the force sensor signals may be analyzed to detect state transitions. The graph 860 plots a vertical force from the force sensor 850 on a vertical axis 862 versus time on a horizontal axis 864. Curve 870 depicts the vertical force versus time. At a time indicated at 880, the pick state transition is detected by a slight rise in the vertical force and a noticeable peak, followed by a decrease in the force to a value lower than before the time 880. These force characteristics are consistent with the human demonstrator 810 grasping the small component part and picking it up, and thus can be used as a state transition trigger to the pick state.

In an extended time indicated at 882, the force value continues along at a lower value than before the pick, as the human demonstrator 810 moves the small component part and begins to place it in its designated target position and orientation. The time 882 corresponds with the move state in the state diagram 300. As in the other state transition logic methods, the transition to the move state follows immediately after the transition to the pick state—i.e., just an instant after the time 880.

At a time indicated at 884, the place state transition is detected by a significant rise in the vertical force and a very noticeable peak, followed by a decrease in the force to a value slightly higher than before the time 884. These force characteristics are consistent with the human demonstrator 810 placing the small component part in its target location and orientation, possibly including applying a downward force to cause the component part to press or snap into place in the assembly workpiece 820. As in the other state transition logic methods, a transition to the release/depart state can be inferred to follow immediately after the transition to the place state—i.e., just an instant after the time 884.

In an alternate embodiment, a force sensor is provided in a tool used by the human demonstrator 810, in the manner shown in FIG. 1. The tool-mounted force sensor would preferably communicate wirelessly with the computer 120. An exemplary scenario would be where a component part is grasped by a tool, and then the component part is installed or inserted into an assembly. In this case, the pick operation is characterized by a peak and an increase in force, the move operation is characterized by relatively level force at the increased value, and the place operation is characterized by a sharp increase in force (possibly with a change of sign from the move state), a peak, and then a drop-off in force to the zero or near-zero value as before the pick state.

In the case of both the tool-mounted force sensor and the force sensor 850 situated below the workpiece 820, the force sensor signals could include any or all three axial forces and any or all three torques, as different components of force and/or torque may contain the most significant characteristics of the state transitions.

Five different methods for state transition logic teaching have been described above. These methods—and combinations thereof—enable precise capturing of the moment of state transition, which in turn enables consistent and accurate capturing of motions from human demonstration, specifically the 3D motion of the hand of the demonstrator. Techniques for improving the quality of the motion teaching are discussed below.

Figure 9:
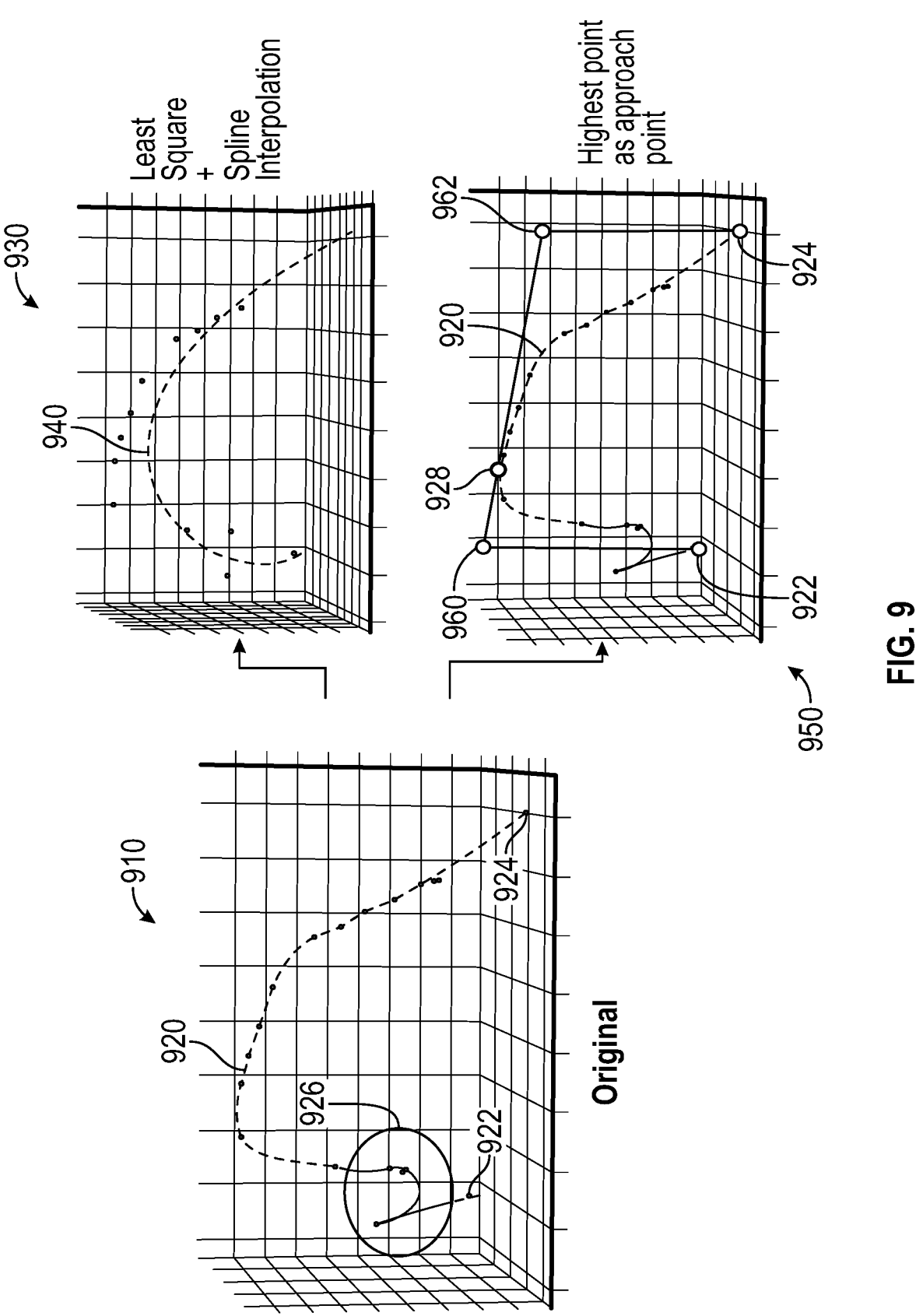
FIG. 9 is an illustration of two techniques for motion refinement in robot program generation, where unwanted extraneous motions of the demonstrator's hand are eliminated from the motion program, according to an embodiment of the present disclosure.

FIG. 9 is an illustration of two techniques for motion refinement in robot program generation, where unwanted extraneous motions of the demonstrator's hand are eliminated from the motion program, according to an embodiment of the present disclosure. When a human demonstrates a pick, move and place operation for robot teaching, the hand of the human may make unintended extraneous motions. The techniques disclosed here use the large-scale motions of the hand (start and end points, and general motion shape), and provide a smoother motion program with better behavior characteristics.

Graph 910 is a 3D graph including a curve 920 plotting the motion of a human hand as it moves an object, at a sequence of points, as the hand is used to demonstrate a pick, move and place operation on the object. The points on the curve 920 have x/y/z coordinates plotted on the three orthogonal axes. The motion of the hand depicted by the curve 920 in this case involves moving the object from a start point 922 (the pick location), up and over an obstacle and to an end point 924 (the place location). The curve 920 includes an area 926 where the human demonstrator, after picking up the object, apparently hesitated, then lowered the object slightly before proceeding with the rest of the movement. The singularity point and the reversal of direction observed in the area 926 are definitely not desirable to include in the robot motion program.

Graph 930 is a 3D graph including a curve 940 plotting a refined motion program for the pick, move and place operation demonstrated by the human in the curve 920. The curve 940 is computed using the original points from the curve 920 as a basis, with a least squares interpolation used to create a new set of points which removes unnecessary or extraneous excursions from the original points, and a spline interpolation used to compute the curve 940 through the new set of points. In the embodiment shown in the graph 930, the curve 940 is used as the motion for the "move" state in the robot program. The least squares fitting and spline interpolation technique of the graph 930 may be applicable in situations where the object "move" motion must pass between multiple obstacles—such as over one and under another.

Graph 950 is a 3D graph including multiple line segments comprising an output robot motion, where the multiple line segments are constructed using the start point 922, the end point 924, and a highest point (maximum z coordinate) 928 from the original points on the curve 920. A first line segment is created by projecting the start point 922 directly upward (same x and y coordinates) to a point 960 which has the same z coordinate as the highest point 928. A second line segment is created from the point 960 to a point 962 which is directly above the end point 924. The second line segment is horizontal, passing through the highest point 928 on its way from the point 960 to the point 962. A third and final line segment is vertically downward from the point 962 to the end point 924. In the embodiment shown in the graph 950, the three line segments (from the start point 922 to the point 960 to the point 962 to the end point 924) are used as the motion for the "move" state in the robot program. The highest point line segment fitting technique of the graph 950 may be applicable in situations where the object "move" motion must simply pass over one or more obstacles.

Figure 10:
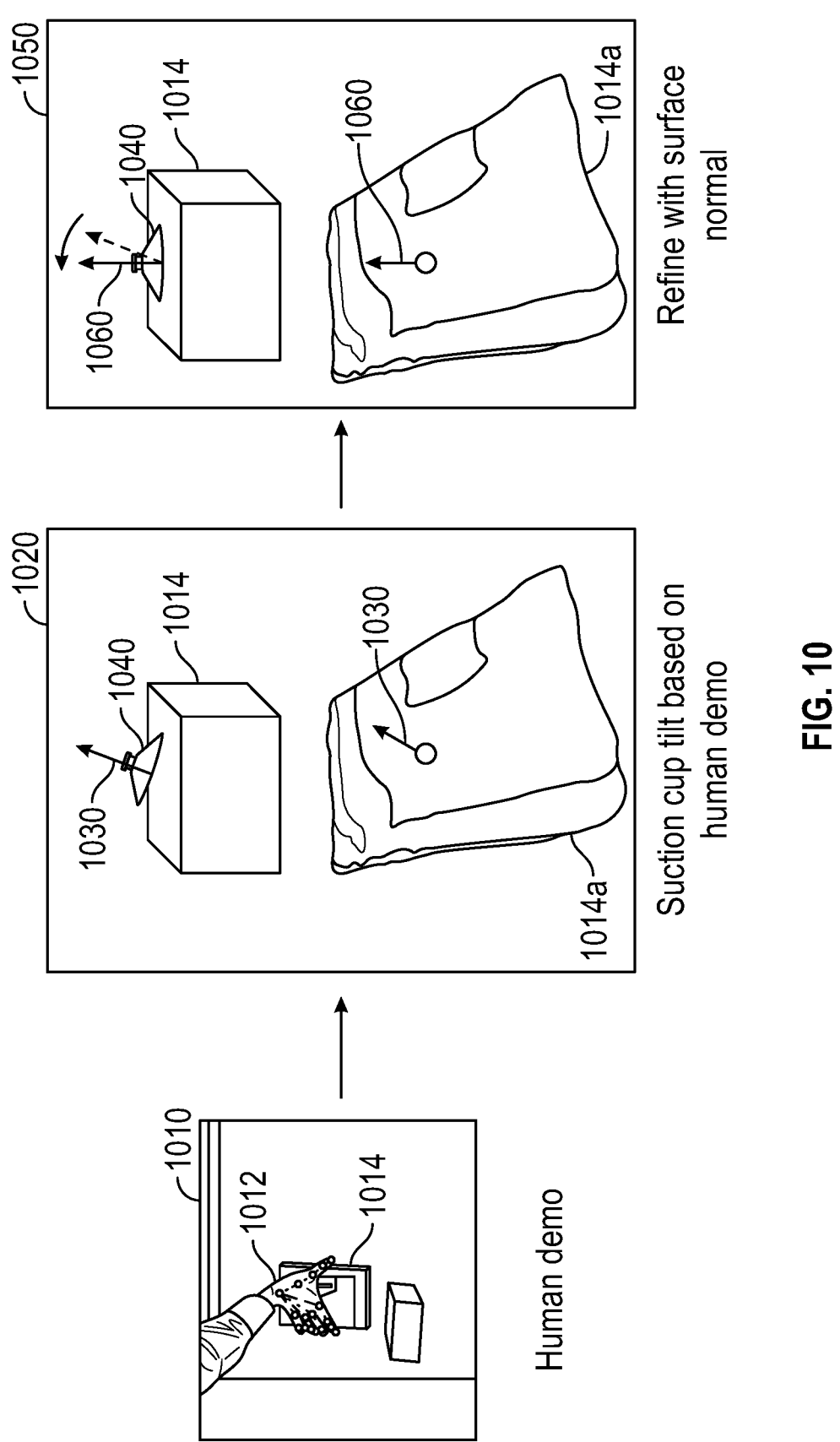
FIG. 10 is an illustration of a technique for grasp pose refinement in robot program generation, where a local gripper axis is oriented normal to a detected surface of the object, according to an embodiment of the present disclosure.

FIG. 10 is an illustration of a technique for grasp pose refinement in robot program generation, where a local gripper axis is oriented normal to a detected surface of the object, according to an embodiment of the present disclosure. In box 1010, a hand 1012 is gripping a workpiece 1014 in a robot teaching demonstration. The human hand 1012, particularly the thumb and index finger, make a fairly good approximation of some robot grippers—such as parallel-jaw grippers and 2- and 3-finger grippers. However, the hand 1012 does not closely approximate a suction cup gripper. This is particularly true because, even for a given position of the fingers and thumb, the human demonstrator's wrist could be at a wide range of angles. This causes the calculations of the hand pose to vary, and may result in a transposed suction gripper pose which is not optimal for the workpiece pose.

Box 1020 contains illustrations of how a human hand pose can be transposed to a suboptimal suction gripper pose, in the manner discussed above. In the lower portion of the box 1020 is an isometric view illustration of a top surface 1014*a* of the workpiece 1014 as defined by a point cloud provided by a 3D camera used as the vision sensor 110. Although the points in the point cloud on the top surface 1014*a* are not all perfectly coplanar, a surface normal can be computed which is quite accurate. The surface normal to the top surface 1010*a* would appear vertical in FIG. 10. However, because of the wrist angle and other factors associated with the pose of the hand 1012, a corresponding gripper axis vector 1030 is computed. In the upper portion of the box 1020, a suction gripper 1040 is shown in an orientation transposed according to the vector 1030. It can be clearly seen that the gripper 1040 is not properly oriented to the workpiece 1014 when the axis of the gripper 1040 is aligned with the vector 1030.

Box 1050 contains illustrations of how the human hand pose can be adjusted based on workpiece surface normal to provide an optimal suction gripper pose, according to the present disclosure. In the lower portion of the box 1050 is the same isometric view illustration of the top surface 1014*a* as in the box 1020. In the box 1050, a gripper axis vector 1060 is aligned with the surface normal vector, rather than being computed from the hand pose. In the upper portion of the box 1050, the suction gripper 1040 is shown in an orientation according to the vector 1060. It can be clearly seen that the gripper 1040 is properly oriented normal to the workpiece 1014 when the axis of the gripper 1040 is aligned with the refined vector 1060. Refining the gripper axis vector based on the object surface normal can improve grasp quality, especially in the case of suction cup grippers.

Figure 11:
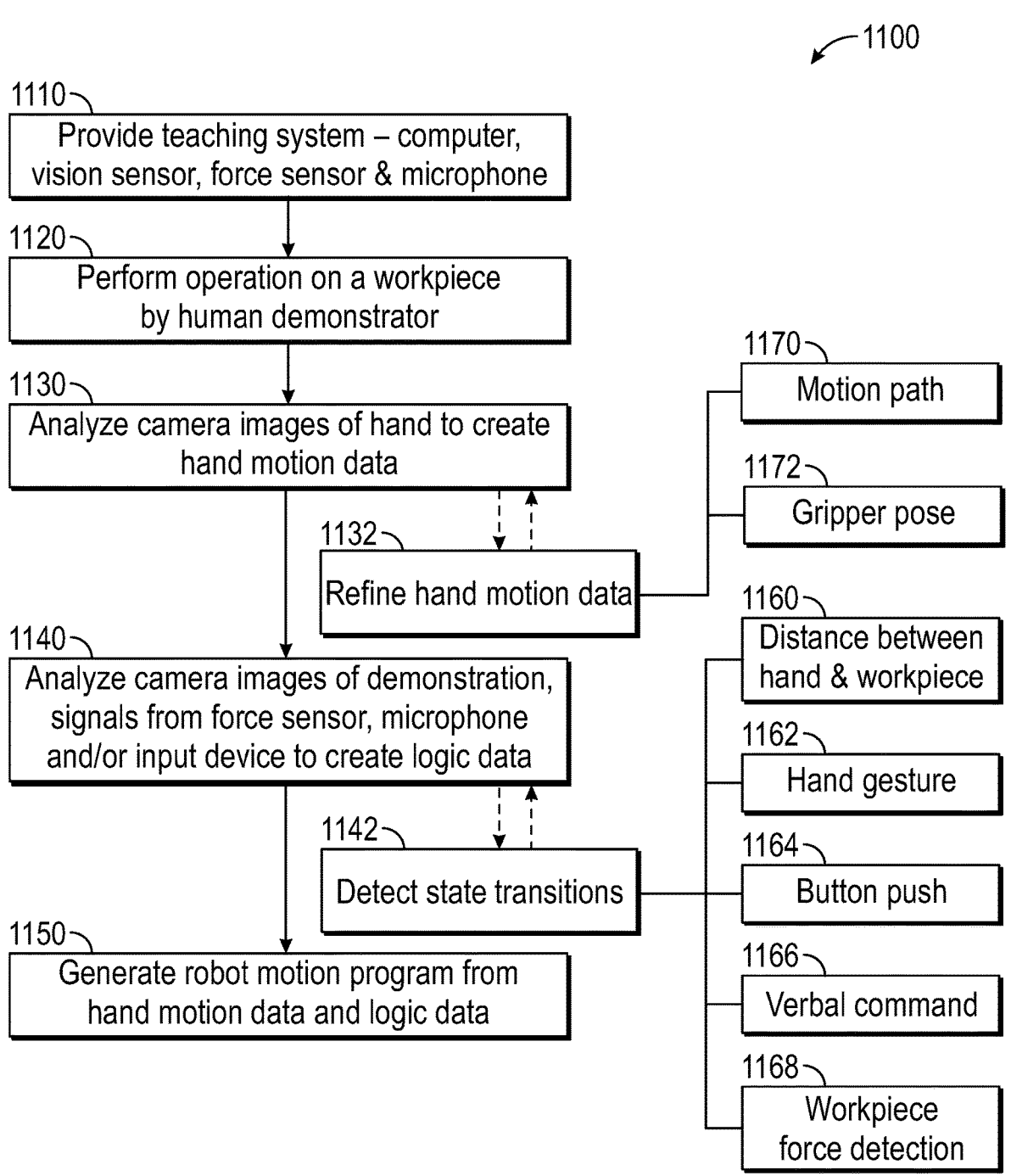
FIG. 11 is a flowchart diagram 1100 of a method for generating a robot motion program from human demonstration, according to an embodiment of the present disclosure.

FIG. 11 is a flowchart diagram 1100 of a method for generating a robot motion program from human demonstration, according to an embodiment of the present disclosure.

At box 1110, a robot teaching system is provided, including a computer with a processor and memory, a vision sensor providing vision signals to the computer, a force sensor providing force signals to the computer, and a microphone providing audio signals to the computer. These elements were shown in FIG. 1 and discussed earlier. The vision sensor is configured such that the hand or hands of a human demonstrator are within the field of view throughout the operation which is demonstrated.

At box 1120, an operation is performed on a workpiece by the human demonstrator, including using a hand to move the workpiece from an initial position and orientation to a final position and orientation. This was also discussed previously—particularly relative to the pick, move and place operation shown in FIG. 2. At box 1130, the vision signals from the vision sensor (camera or other) are analyzed to determine a pose of the hand of the human demonstrator at multiple time steps, where the pose of the hand includes three-dimensional (3D) coordinates of a plurality of key points on digits of the hand. Again, this was discussed earlier—particularly the techniques for determining hand pose (key point x/y/z coordinates) from images from a single 2D or 3D camera which were disclosed in the '185 application. The hand pose data for the time steps is stored as hand motion data for use in a later process step.

At box 1140, data from the vision sensor/camera, and other available sensors, is analyzed to create logic data. As discussed earlier, the logic data is used to supplement the hand motion data by recognizing certain events. The logic teaching, performed concurrently with the motion teaching, adds precision and removes ambiguity in the creation of the gripper motion program. At box 1150, the hand motion data from the box 1130, and the logic data from the box 1140 are used to generate a motion program to cause a robot gripper to perform the operation on the workpiece, where the motion program includes a sequence of steps each having a gripper position and orientation. Each step of the motion program may optionally include a grip/ungrip command. The grip/ungrip commands are only needed at the pick and place locations in a pick, move and place operation.

At box 1142, state transitions are detected in the operation being demonstrated, based on a defined state machine model as in FIG. 3. The state transitions—such as from move to place, were discussed in detail above. Five different techniques were disclosed for triggering state transitions—including computing distance between hand and workpiece (box 1160), detecting a gesture by a second hand of the human (box 1162), a button push by the second hand (box 1164), a verbal command by the human demonstrator (box 1166), and workpiece force detection and signal analysis (box 1168).

The state transition detection at the box 1142 provides a specific form of the logic data teaching at the box 1140. When state transition detection is performed, the state transition logic is used to precisely define certain events in the gripper motion program—such as the steps (pick and place) at which gripper velocity drops to zero, and the steps (again pick and place) at which a grip or ungrip command is issued. The definition of the state machine model, in advance, allows each state transition to be anticipated such that a particular, recognizable event triggers the appropriate transition.

At box 1132, the hand motion data created at the box 1130 may optionally include motion refinements as discussed in connection with FIGS. 9 and 10—to improve the gripper motion by eliminating extraneous motions which were unintentionally made by the human hand (box 1170), and/or to improve gripper axis orientation relative to a workpiece surface (box 1172).

Transforming hand pose data directly into the gripper motion program offers two significant benefits over prior methods. First, by eliminating workpiece detection from the images for motion teaching, the presently disclosed method reduces computational burden and program complexity. Second, eliminating workpiece detection from the images also solves the problem of workpiece occlusion by the human's hand. Existing systems which require workpiece pose data for robot motion teaching typically need image data from more than one camera in order to ensure workpiece visibility. However, fusing coordinate data from multiple cameras requires complex calibration steps. As long as the object/workpiece pose (position and orientation) are known during the approach state, a sequence of hand pose steps (the hand motion data) is sufficient to define a robot gripper motion program.

After the gripper motion program is created at the box 1150, the motion program is transferred from the computer used for teaching demonstration (the computer 120 in FIG. 1) to a robot controller (the controller 170) for execution by a robot communicating with the controller. This was all discussed previously in connection with FIG. 1. Alternately, in some embodiments, the motion program generation from human demonstration could be performed directly on the robot controller 170 with the required sensor inputs.

Throughout the preceding discussion, various computers and controllers are described and implied. It is to be understood that the software applications and modules of these computers and controllers are executed on one or more computing devices having a processor and a memory module. In particular, this includes the processors in the computer 120 and the robot controller 170 shown in FIG. 1. Specifically, the processors in the computer 120 and/or the robot controller 170 are configured to perform the techniques for robot program generation from human demonstration, including hand motion capture and analysis, state detection and motion refinement, in the manner discussed above.

As outlined above, the disclosed techniques for robot program generation by human demonstration make robot motion programming faster, easier and more intuitive than previous techniques, while providing robustness against variations and vagaries in human hand motion through discrete state transition detection and motion path improvements.

While a number of exemplary aspects and embodiments of robot program generation by human demonstration have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for creating a robot motion program from human demonstration, said method comprising: defining a state machine model for an operation including a sequence of states and transitions around a continuous loop, where the sequence of states consists of a pick state, a move state, a place state and a depart/approach state; demonstrating an operation on a workpiece by a hand of a human demonstrator;

analyzing camera images of the hand demonstrating the operation on the workpiece, by a computer having a processor and memory, to create hand motion data;

analyzing one or more of camera images of the demonstrating, signals from a force sensor, signals from a microphone and signals from an input signaling device, by the computer, to create logic data, where the logic data triggers transitions only from a current state to a next state in the state machine model, wherein creating the logic data includes detecting state transitions during the operation, using the state transitions to synchronize gripper activate and deactivate commands with particular time steps in the hand motion data, and including the gripper activate and deactivate commands in the robot motion program, and wherein detecting state transitions includes receiving signals from a force sensor configured to detect forces on the workpiece during the operation and triggering a state transition based on the signals from the force sensor, including detecting a peak followed by a drop-off in the signals from the force sensor to trigger a pick state transition or a place state transition; and generating the robot motion program based on the hand motion data and the logic data, said program including instructions to cause a robot to manipulate a gripper to perform the operation on the workpiece.

2. The method according to claim 1 wherein the camera images are taken by a single two-dimensional (2D) or three-dimensional (3D) camera.

3. The method according to claim 1 wherein analyzing camera images of the hand demonstrating the operation includes identifying three-dimensional (3D) coordinate locations of a plurality of points on the hand, including a tip, a base knuckle and a second knuckle of each of a thumb and a forefinger.

4. The method according to claim 3 wherein generating a robot motion program includes, for each of a plurality of time steps depicted by one of the camera images, computing a hand coordinate frame based on the 3D coordinate locations of the plurality of points on the hand, converting the hand coordinate frame to a gripper coordinate frame defining a position and orientation of a gripper, and generating the robot motion program using the gripper coordinate frame at the plurality of time steps.

5. The method according to claim 1 wherein detecting state transitions includes analyzing the camera images of the hand and the workpiece to determine a distance between a hand center point and a workpiece center point.

6. The method according to claim 5 wherein a pick state transition is triggered by the distance between the hand center point and the workpiece center point dropping below a predefined threshold, a move state transition from the pick state is triggered by motion of the hand center point from one time step to the next, and a place state transition from the move state is triggered by the distance between the hand center point and the workpiece center point exceeding the predefined threshold or a newly calculated threshold.

7. The method according to claim 1 wherein detecting state transitions includes analyzing the camera images of a second hand of the human demonstrator and triggering a state transition when a predefined gesture by the second hand is detected.

8. The method according to claim 1 wherein detecting state transitions includes receiving signals from a device configured to register a button push by a second hand of the human demonstrator and triggering a state transition when the button push is detected.

9. The method according to claim 1 wherein detecting state transitions includes receiving signals from a microphone configured to detect verbal commands from the human demonstrator and triggering a state transition when a predefined verbal command is detected, including a corresponding state transition for each of the words pick, move and place.

10. The method according to claim 1 wherein creating the hand motion data includes refining the hand motion data before generating the robot motion program, including performing a least squares fit on the hand motion data to create refined hand motion data, and computing a spline interpolation through the refined hand motion data to generate the robot motion program.

11. The method according to claim 1 wherein creating the hand motion data includes refining the hand motion data before generating the robot motion program, including replacing the hand motion data with a piecewise linear function having a vertical line segment upward from a start point followed by a horizontal line segment through a highest point in the hand motion data followed by a vertical line segment downward to an end point, and using the piecewise linear function to generate the robot motion program.

12. The method according to claim 1 wherein creating the hand motion data includes refining the hand motion data before creating the robot motion program, including replacing a gripper axis determined from the hand motion data with a gripper axis computed from a normal to a surface of the workpiece.

13. The method according to claim 1 further comprising using the robot motion program, by a robot controller, to cause the robot to manipulate the gripper to perform the operation on the workpiece.

14. A system for generating a robot motion program from human demonstration of an operation, said system comprising:

a vision sensor, including a two-dimensional (2D) or three-dimensional (3D) camera;

a microphone;

a force sensor; and a computer having a processor and memory, said computer receiving signals from the vision sensor, the microphone and the force sensor and being configured to generate the robot motion program using steps including;

defining a state machine model for an operation including a sequence of states and transitions around a continuous loop, where the sequence of states consists of a pick state, a move state, a place state and a depart/approach state;

analyzing camera images of a hand of a human demonstrator demonstrating the operation on a workpiece to create hand motion data;

analyzing one or more of camera images of the demonstrating, signals from the force sensor, signals from the microphone and signals from an input signaling device, to create logic data, where the logic data triggers transitions only from a current state to a next state in the state machine model, wherein creating the logic data includes detecting state transitions during the operation, using the state transitions to synchronize gripper activate and deactivate commands with particular time steps in the hand motion data, and including the gripper activate and deactivate commands in the robot motion program, and wherein detecting state transitions includes receiving signals from the force sensor configured to detect forces on the workpiece during the operation and triggering a state transition based on the signals from the force sensor, including detecting a peak followed by a drop-off in the signals from the force sensor to trigger a pick state transition or a place state transition; and generating the robot motion program based on the hand motion data and the logic data, said program including instructions to cause a robot to manipulate a gripper to perform the operation on the workpiece.

15. The system according to claim 14 wherein analyzing camera images of the hand demonstrating the operation includes identifying 3D coordinate locations of a plurality of points on the hand, including a tip, a base knuckle and a second knuckle of each of a thumb and a forefinger.

16. The system according to claim 15 wherein generating a robot motion program includes, for each of a plurality of time steps depicted by one of the camera images, computing a hand coordinate frame based on the 3D coordinate locations of the plurality of points on the hand, converting the hand coordinate frame to a gripper coordinate frame defining a position and orientation of a gripper, and generating the robot motion program using the gripper coordinate frame at the plurality of time steps.

17. The system according to claim 14 wherein detecting state transitions includes analyzing the camera images of the hand and the workpiece to determine a distance between a hand center point and a workpiece center point, where a pick state transition is triggered by the distance between the hand center point and the workpiece center point dropping below a predefined threshold, a move state transition from the pick state is triggered by motion of the hand center point from one time step to the next, and a place state transition from the move state is triggered by the distance between the hand center point and the workpiece center point exceeding the predefined threshold or a newly calculated threshold.

18. The system according to claim 14 wherein detecting state transitions includes analyzing the camera images of a second hand of the human demonstrator and triggering a state transition when a predefined gesture by the second hand is detected.

19. The system according to claim 14 wherein detecting state transitions includes receiving signals from a device configured to register a button push by a second hand of the human demonstrator and triggering a state transition when the button push is detected.

20. The system according to claim 14 wherein detecting state transitions includes receiving signals from a microphone configured to detect verbal commands from the human demonstrator and triggering a state transition when a predefined verbal command is detected, including a corresponding state transition for each of the words pick, move and place.

21. The system according to claim 14 wherein creating the hand motion data includes refining the hand motion data before generating the robot motion program, including refitting the hand motion data using least squares and spline interpolation calculations or a piecewise linear calculation, or replacing a gripper axis determined from the hand motion data with a gripper axis computed from a normal to a surface of the workpiece, or both.

22. A method for creating a robot motion program from human demonstration, said method comprising:

defining a state machine model for an operation including a sequence of states and transitions around a continuous loop, where the sequence of states consists of a pick state, a move state, a place state and a depart/approach state;

demonstrating an operation on a workpiece by a hand of a human demonstrator;

analyzing camera images of the hand demonstrating the operation on the workpiece, by a computer having a processor and memory, to create hand motion data, wherein creating the hand motion data includes refining the hand motion data before generating the robot motion program, including performing a least squares fit on the hand motion data to create refined hand motion data, and computing a spline interpolation through the refined hand motion data to generate the robot motion program;

analyzing one or more of camera images of the demonstrating, signals from a force sensor, signals from a microphone and signals from an input signaling device, by the computer, to create logic data, where the logic data triggers transitions only from a current state to a next state in the state machine model; and generating the robot motion program based on the hand motion data and the logic data, said program including instructions to cause a robot to manipulate a gripper to perform the operation on the workpiece.

23. A method for creating a robot motion program from human demonstration, said method comprising:

defining a state machine model for an operation including a sequence of states and transitions around a continuous loop, where the sequence of states consists of a pick state, a move state, a place state and a depart/approach state;

demonstrating an operation on a workpiece by a hand of a human demonstrator;

analyzing camera images of the hand demonstrating the operation on the workpiece, by a computer having a processor and memory, to create hand motion data, wherein creating the hand motion data includes refining the hand motion data before generating the robot motion program, including replacing the hand motion data with a piecewise linear function having a vertical line segment upward from a start point followed by a horizontal line segment through a highest point in the hand motion data followed by a vertical line segment downward to an end point, and using the piecewise linear function to generate the robot motion program;

analyzing one or more of camera images of the demonstrating, signals from a force sensor, signals from a microphone and signals from an input signaling device, by the computer, to create logic data, where the logic data triggers transitions only from a current state to a next state in the state machine model; and generating the robot motion program based on the hand motion data and the logic data, said program including instructions to cause a robot to manipulate a gripper to perform the operation on the workpiece.

*     *     *     *     *